(12) United States Patent
Dacey

(10) Patent No.: US 7,374,149 B1
(45) Date of Patent: May 20, 2008

(54) ROAD CROSSING ASSISTANT FOR INSTALLING OPTICAL FIBER TELEPHONE CABLE

(75) Inventor: James P. Dacey, Taunton, MA (US)

(73) Assignee: Verizon New England Inc., Boston, MA (US)

( * ) Notice: Subject to any disclaimer, the term of this patent is extended or adjusted under 35 U.S.C. 154(b) by 154 days.

(21) Appl. No.: 11/213,586

(22) Filed: Aug. 26, 2005

(51) Int. Cl.
*B66F 3/00* (2006.01)
(52) U.S. Cl. .............................. 254/134; 254/134.3 R
(58) Field of Classification Search ................ 254/134, 254/134.3 FT, 134.4 R
See application file for complete search history.

(56) References Cited

U.S. PATENT DOCUMENTS

| | | | |
|---|---|---|---|
| 1,683,578 A | * | 9/1928 | Mobius et al. ............... 182/36 |
| 5,645,265 A | * | 7/1997 | Shu ..................... 254/134.3 FT |
| 5,826,859 A | * | 10/1998 | Kononov et al. ...... 254/134.3 R |
| 6,370,753 B1 | * | 4/2002 | Washburn ................ 29/407.01 |

\* cited by examiner

*Primary Examiner*—Lee D Wilson

(57) ABSTRACT

A road crossing tool to assist in, and enable, a one-person installation of fiber optic cable which must be connected to a utility pole first, before being connected to a house on the opposite side of the road. Since fiber optic cable is not readily spliced in the field, as compared to copper wire cable which is readily spliceable, the fiber cable is supplied pre-connectorized with fixed lengths. This causes slack, or un-necessary cable length, which must be stored at the building/house site rather than atop the utility pole. This tool permits the installer to have good visibility of the roadway after making the cable connection to the utility pole and prior to hoisting the cable to its intended elevated height over the roadway before making the cable connection to the house and storing the slack at the house. This eliminates the need for a two person installation which would otherwise be required.

13 Claims, 5 Drawing Sheets

ROAD CROSSING ASSISTANT FOR INSTALLING OPTICAL FIBER TELEPHONE CABLE

BACKGROUND OF THE INVENTION

1. Field of the Invention

The present invention relates to a tool that facilitates installation of a line from a utility pole located adjacent a traveled roadway to a building located on the opposite side of the roadway and, more particularly, relates to enabling one-person installation of optical fiber telecommunication cable from a utility pole on one side of a traveled roadway to a building located across that roadway.

2. Description of Prior Art

The installation of telephone cable from high telephone poles to a similarly high connection point on homes, businesses and other facilities is a physical challenge. The installer-technician needs to make the appropriate connection while braving the elements atop a telephone pole, or while supported within an elevated installation bucket. Location of the building to which the other end of the wire shall be connected can add to the challenge. Moreover, telephone companies prefer to dispatch only one installer-technician per job, rather than two in the interests of cost-effectiveness, if at all possible.

In the past, where copper wire line may have been the standard communication wire, that copper cable could be cut to exact length to run from its connection point at the building to its connection point at the telephone pole, without slack. In that scenario, using only a single installer, the connection to the building may be made first and the connection to the telephone pole is made second, regardless of whether or not a road crossing is required. The reason for this particular sequence is because the telephone pole is almost always located immediately adjacent the roadway. This sequence takes into account good road traffic visibility from the telephone pole's location.

For example, if the connection to the building is made first, even if roadway traffic is not visible from the building because of blocking foliage or because of a large setback from the roadway, only one installer technician needs to be deployed to the copper wire installation. This is because of the location of the telephone pole next to the roadway. After connection to the building, the installer-technician can carry the loose end of the copper wire across the street to the location of the telephone pole, and stay on the ground with the wire on the roadway surface allowing cars to drive over it without causing damage to the wire. From the side of the roadway next to the telephone pole, the installer has a good view of traffic in both directions. The technician can climb the pole (or use an automated elevator-bucket) and when the traffic is clear can pull the wire up quickly to the standard eighteen foot height, and make the installation to the telephone pole without unused cable excess while traffic flows underneath the wire. In this instance, only one installer technician is needed per installation, regardless of whether the building to be connected is on the same side of the street or the opposite side of the street as the telephone pole, because of road visibility from the telephone pole location.

However, with optical fiber telephone cable, the situation is quite different because the reverse installation sequence must be used. Fiber cable comes with pre-attached, factory-installed, connectors on cable of standard lengths, such as 100 ft. or 150 ft. lengths. Fiber cable cannot easily be cut and readily be spliced to exact lengths in the field, as copper cable can. If, for example, the total span from utility pole to building connection point is 110 feet, the installer needs to use the 150 foot standard optical cable, causing a 40 foot unavoidable cable slack. The slack must be stored at the building, not on the telephone pole, according to current protocol. Therefore, the telephone pole connection must be made first, which makes the installation at the building almost impossible unless there is a second person present standing at the roadway to signal the installer at the building when roadway traffic is clear. When the clear signal is given by the second person, the installer can pull up the cable to appropriate height on the building and make the installation and form the slack cable into a loop for storage at the building location.

Approximately fifty percent of the homes in a neighborhood are located on the side of the street opposite from the location of the telephone pole. The requirement of two people per fiber optic cable installation versus one person for copper installation is a cost problem, even for fifty percent of the installations. What is needed is a mechanical assistant to enable fiber optic cable installations by only one human installer, regardless of which side of the street the telephone pole is located relative to the house or building being connected. The present invention offers such a welcome solution to this problem of the prior art.

SUMMARY OF THE INVENTION

Embodiments of the present invention include apparatus and methodology for facilitating installation of a line by a single human installer-technician. In a particular embodiment, the line is a pre-connectorized fiber-optic telephone line having a standard fixed length. One end of the line is connected from a first connector elevated above ground, possibly around eighteen feet, and mounted on an erected utility pole. The pole is located at one side of a roadway. There may be vehicular traffic on the roadway. The other end of the line is connected to another like-elevated connector which may be mounted on a building located on the opposite side of the roadway. Excess length of line, line slack, if any, is stored at the building side.

The apparatus is also located on the opposite side of the roadway and it includes a base for resting upon the ground, whether earth or hard surface. There is a vertical mast or member, such as a hand-manageable pole or group of interconnecting poles, extending upward from the base. There is a mechanism mounted at the top of the pole which permits the line to be fed through it in a first direction (e.g., from the telephone pole towards the building). The height of the mechanism may be approximately equal to the elevation of the first connector. The mechanism also engages the line to prevent it from displacement in a direction opposite to the first direction (e.g., from the building towards the utility pole). This permits the installer to connect the other end of the line to the other connector on the building, make the line taut, and store the slack, if any at the building site. The mechanism then disengages the line in response to a downward displacement on the vertical member caused by the installer pulling downward on it against the taut line. The connections of one end to the utility pole and of the other end to the building are not disturbed by this downward displacement.

A particular embodiment of this apparatus includes the mechanism having two spring-loaded rollers, each roller being rotatable only in one direction. The spring forces tend to pull the rollers together into a first position in which the axes of rotation of the rollers are generally parallel. There is a latch that helps to maintain the roller devices in the first position, wherein each of the rollers rotates in its one direction when the line is pulled or displaced in the first direction (e.g., towards the building from the utility pole). The rollers are arranged to firmly grip the line between the rollers when attempted displacement of the line in the direction opposite to the first direction attempts to cause each roller to rotate in a direction opposite to its one direction. The rollers can include a ratcheting mechanism to permit rotation only in one direction. There is a rotatable trigger tab connected to the axis of rotation of one of the rollers which is arranged to strike the latch when that roller is angularly displaced about its axis of rotation in response to force being applied to that roller by the taut line resulting from a downward pull on the vertical member by the installer. This prevents the latch from maintaining its first position and disengages the line.

It is thus a general object of the present invention to provide an improved technique for permitting installation of a line or cable across a roadway by a single installer, regardless of the type of line or cable.

It is another general object of the present invention to provide an improved technique for cable installation where the cable connection to a utility pole adjacent the roadway must be made before the connection to a building located on the other side of the roadway.

It is yet another object of the present invention to provide an improved method and apparatus for installing fiber optical telephone lines or cables.

It is thus advantageous to utilize embodiments of the present invention when a single installer is performing line installation, such as fiber optical telephone line installation.

Other objects and advantages shall become apparent after reviewing the detailed description of the preferred embodiments in conjunction with the drawings in which:

DETAILED DESCRIPTION OF THE PREFERRED EMBODIMENTS

Figure 1:
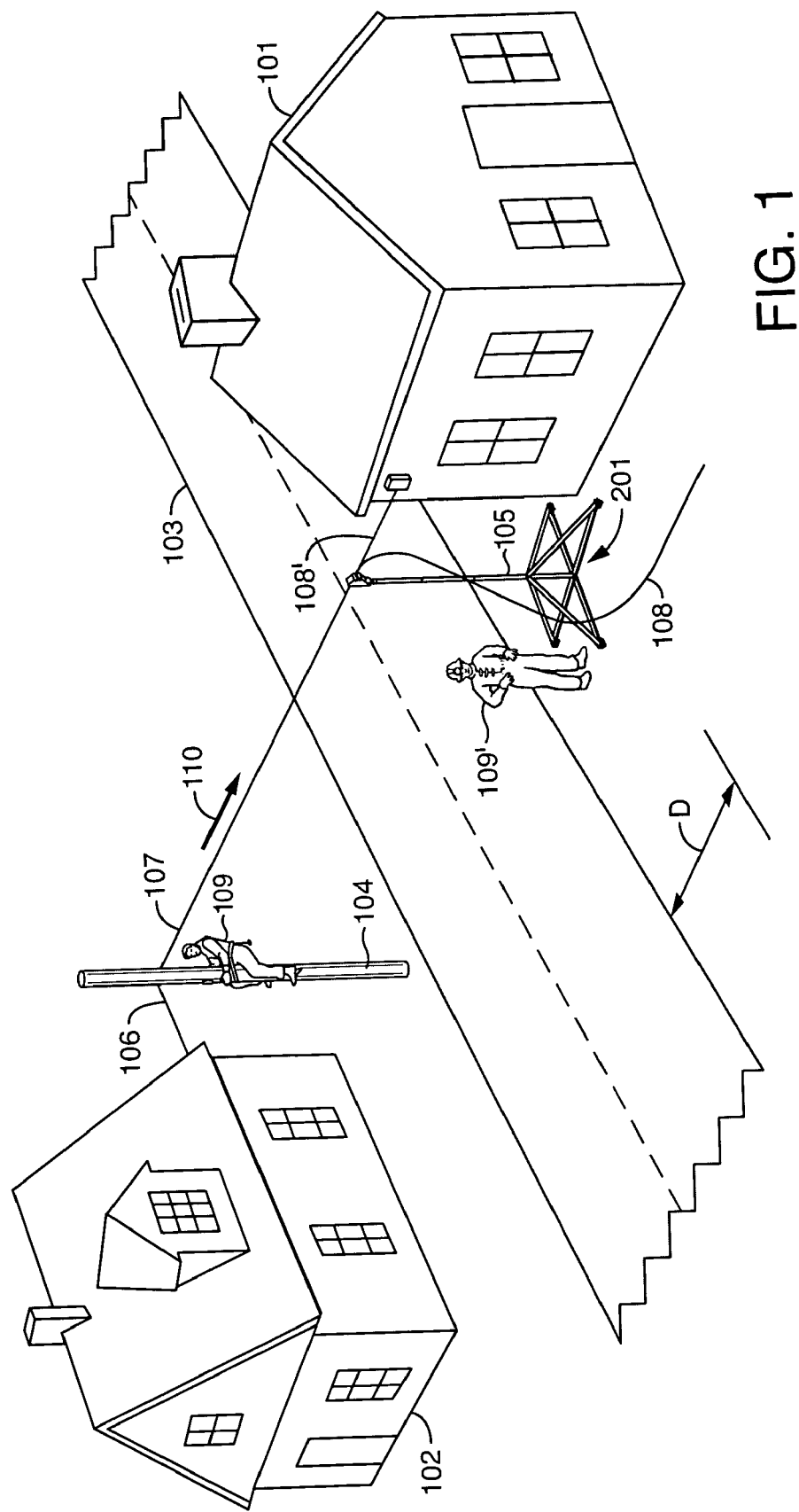
FIG. 1 shows an exemplary environment in which embodiments of the present invention may be useful.

FIG. 1 depicts an environment in which embodiments of the present invention may be useful. Houses or buildings 101 and 102 are shown located on opposite sides of roadway 103. Utility pole 104 is shown on the same side of the roadway as house 102. Cable section 106 between house 102 and utility pole 104 is not impacted by roadway traffic since its connection to the house from the utility pole does not span the roadway. But, cable section 107, which is continuous with cable section 108 or 108' is problematical because the connection from utility pole 104 to house 101 spans roadway 103. (Cable section 108 is intended to show the cable in a flexible state before its connection to house 101, and cable section 108' is intended to show the same cable section in a taut state after its connection to house 101, slack not shown. The lengths of cable sections 108 and 108' are identical because they are the same section, but under two different conditions. Cable section 107 runs from utility pole to road crossing tool 105 and is continuous with cable section 108 [108']. Cable section 108' runs from tool 105 to house 101.) With vehicles traveling on the roadway, if house setback distance D is relatively large, or if the view of the roadway from the connection point on house 101 is obstructed by trees, etc. (not shown), then more than one installer is needed to safely complete this installation, unless embodiments of the present invention are used.

In the connection of broadband fiber-optic telephone and data cable, the connection must be made at the utility pole first because of factory-generated fixed length cables having pre-mounted connectors on both ends. Since actual distances from utility pole to building connection point shall almost always be different from a factory-generated "standard" length cable, the cable slack (not shown) is stored at the house location rather than on top of the utility pole, as earlier described.

In a typical installation using embodiments of the present invention, installer 109 may first make the connection to house 102 with cable section 106. Cable section 106 is not electrically or optically connected to cable sections 107/108. Thereafter, installer 109 may make the connection of cable 107 to utility pole 104. At this point, all of cable 107/108 may be at the base of the utility pole (cable not shown in this position), and road crossing tool 105 is also located at the base of utility pole 104 (road crossing tool not shown in this position). Same installer 109' next places base 201 (FIG. 2) of road crossing tool 105 on the other side of the roadway and near the roadway to allow good visibility of the roadway from that location. The installer returns to the utility pole side to pick up cable 107/108 and mast section 202, 203, 204 (FIG. 2) with cable-holder 205 (FIG. 2) attached thereto. When traffic sufficiently clears, the cable and the mast section with attached cable-holder are carried across the roadway and installer 109' threads the cable through cable holder 205, inserts the mast into the base, and pulls on the cable until cable section 107 is taut and safely elevated (typically eighteen feet) above the roadway. All of this motion and activity can take less than thirty seconds to a minute, and shall not delay traffic significantly. With the installer standing immediately adjacent the roadway because of the advantages obtained using the road crossing tool, he/she can signal to oncoming traffic to momentarily stop, if necessary. Safety cones and other standard safety measures are undertaken as well. Then, while cable section 107 is held in its elevated place by tool 105, with traffic passing safely thereunder, connection 108 can be safely and conveniently made to house 101. Only one installer (109/109') is needed for this installation, where two people were required before using this road crossing tool.

In another typical installation, after connection to the utility pole 104 is made, the installer can place the base of the road crossing tool across the roadway and next to the roadway. The installer can also place the mast with cable holder across the roadway on the ground next to the base. The installer can then, when traffic permits, carry the unconnected end of the cable across the street allowing it to unravel onto the roadway. Vehicles can drive over the cable without damaging it. The installer can then thread the end of the cable into the cable holder, momentarily leaving cable section 107 in a slack condition on the roadway, and insert the vertical mast into the base. When the traffic slows down, which the solitary installer can easily judge from the good vantage point on the edge of the roadway, the installer can quickly pull on the cable to raise it to full height safely above the ensuing traffic flow.

Figure 2:
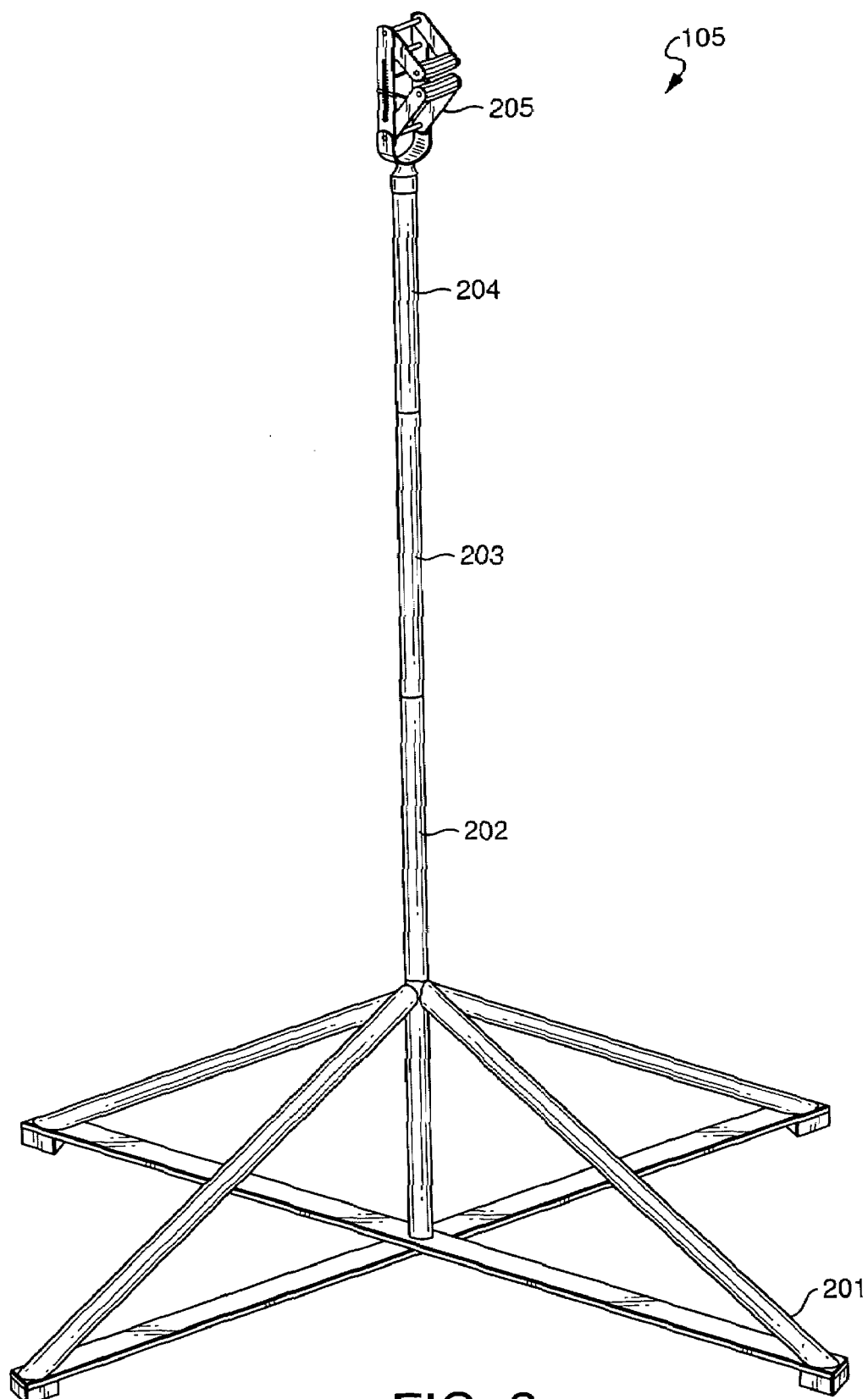
FIG. 2 is an exemplary diagram of the present invention showing its base, vertical member and cable-holder mechanism atop the vertical member.

FIG. 2 depicts the road crossing tool, including base 201, mast sections 202, 203 and 204 and cable-holder mechanism 205 atop the mast. The mast sections are modular poles which can be inserted into each other to make whatever connection height is desired. The base is sufficiently weighted to ensure stability of the mast when vertically inserted into the base. The mast pole sections can be made from fiberglass or some other lightweight, strong and non-conductive material. Cable-holder mechanism 205 can be fabricated from steel or a combination of steel and aluminum, and includes metal springs, ratcheted or rubberized rollers and other functionality to be described.

Figure 3:
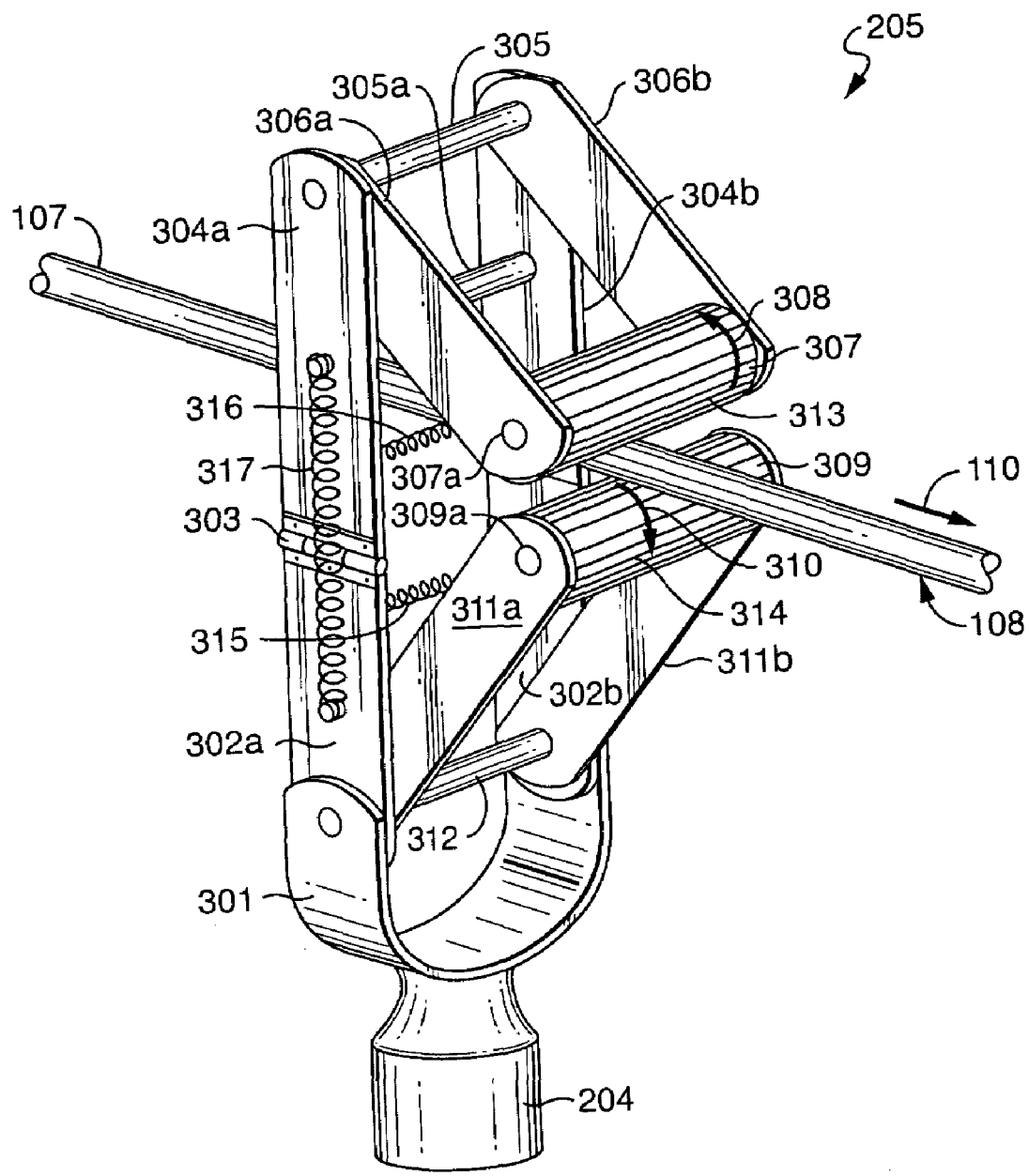
FIG. 3 is an exemplary diagram of the cable-holder mechanism of FIG. 2 shown engaging a line or cable.

FIG. 3 depicts cable-holder mechanism 205 in a closed position, showing cable 107/108' inserted therethrough. Cable 107/108' is shown as being drawn taut which would be its condition after cable portion 108' is connected to house 101. Top of mast 204 is shown at the bottom of mechanism 205. Metallic "U" support 301 is connected from mast section 204 and supports fixed side legs 302a and 302b. Hinge 303 is attached to the end of side leg 302a in a manner to connect to movable side leg 304a. Spring 317, shown stretched in this view, is connected between fixed leg 302a and movable leg 304a. Movable side leg 304a is fixedly connected to movable side leg 304b by way of axel 305 and fixed brace 305a. An upper roller component is formed from rotatable arms 306a and 306b in combination with roller 307. Ridges 313 on roller 307 are useful for gripping cable 107/108'. Axel 307a is the axis of rotation for roller 307 as well as being a support brace between arms 306a and 306b. The upper roller component is spring loaded via spring 316, the spring being connected between movable leg 304a and rotatable arm 306a. The force of spring 316 tends to pull roller 307 down against the cable. Similarly, a lower roller component is formed from rotatable arms 311a and 311b, which rotate around axel 312, in combination with roller 309. Axel 312 also serves as a support brace across U support 301. Ridges 314 on roller 309 are useful for gripping cable 107/108'. Axel 309a is the axis of rotation for roller 309 as well as being a support brace between arms 311a and 311b. The lower roller component is spring loaded via spring 315, the spring being connected between fixed side leg 302a and movable arm 311a. The force of spring 315 tends to pull roller 309 up against the cable.

In operation, after cable 107/108 (prior to it being made taut and not shown in this view) was inserted by the installer between rollers 307 and 309 in the direction of arrow 110, the installer pulls on cable 108 until cable portion 107 is made taut. When pulling on the cable, rollers 307 and 309 rotate in the directions of arrows 308 and 310 respectively. Rollers 307 and 309 cannot rotate in directions opposite to those of arrows 308 and 310 because they are ratcheted (not shown). Thus, the cable is held in that taut position by ridges 313 formed in roller 307 and ridges 314 formed in roller 309 which grip the cable as a result of forces generated by springs 316 and 315 pulling on rotatable arms 306a and 311a, respectively, against the cable. As the cable is held in that position by the ridges in the rollers, the installer completes the installation resulting in the taut cable section 108'. Alternatively, the rollers can be rubberized to create friction to hold the cable in place with or without ridges. Operation of disengagement from cable holder 205 is discussed below in connection with FIGS. 4 and 5.

Figure 4A:
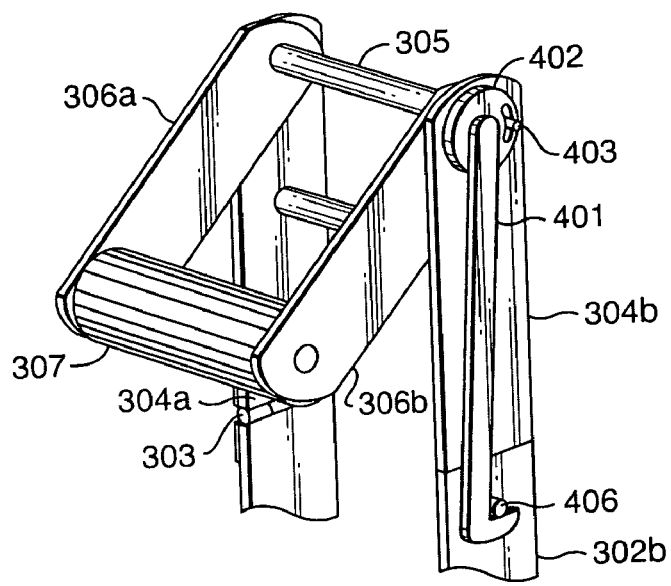
FIG. 4A is another view of a portion of the cable-holder mechanism of FIG. 3 showing its latch and rotatable trigger tab.
Figure 4B:
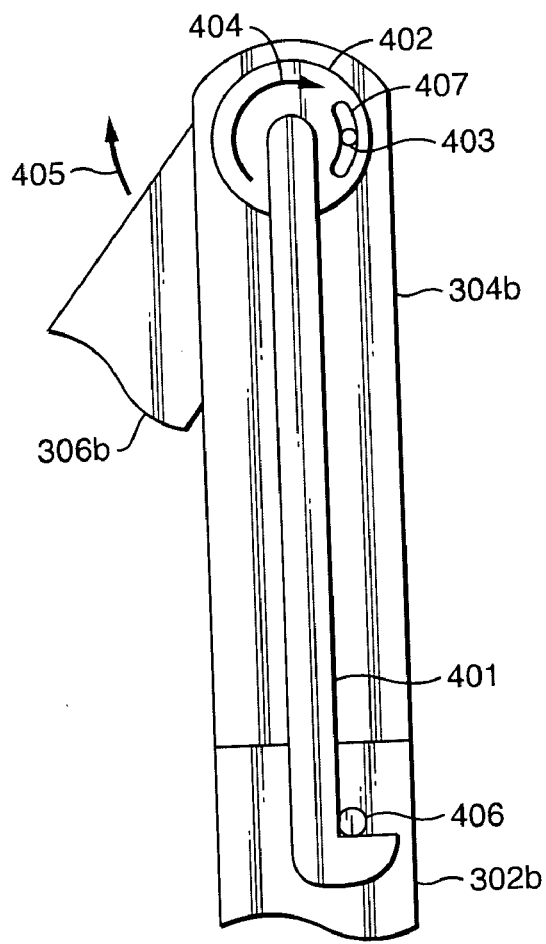
FIG. 4B is an enlarged view of a portion of FIG. 4A showing more detail; and, FIG. 5 is an exemplary diagram of the mechanism of FIG. 3 shown in a position in which the line-holder mechanism may be disengaged from the line.

FIG. 4A is a view of the other side of a portion of cable holder 205, that side being partially hidden from view in FIG. 3. FIG. 4B is an enlarged view of FIG. 4A showing more detail. Reference should be made to both FIGS. 4A and 4B together with respect to the following discussion. Latch 401 is a metal arm that is shown in its closed position, latching under holding pin 406. Latch 401 is rotatable around the axis of axel 305, but is not operatively connected to axel 305. Thus rotation of axel 305 does not necessarily cause latch 401 to move. But, cam 402, located on the outside of movable leg 304b, is operatively connected to axel 305 and is therefore constrained to rotate therewith. Cam 402 rotates in direction 404 when rotatable arm 306a and 306b move in direction 405. Trigger-tab 403 is affixed to cam 402 and rotates therewith. When cam 402 rotates sufficiently, trigger tab 403 strikes latch 401 and moves it away from its closed position. Latch 401 was held in its closed position by the static force of spring 317 (FIG. 3) pulling on movable leg 304a, that force being transferred to latch 401 pulling against holding pin 406. Slot 407, formed in cam 402 permits adjustment of trigger tab 403 within that slot. Moving trigger tab in the direction of arrow 404 and fixedly positioning it in the slot reduces the "play" or hysteresis motion of movable arms 306a/b. Conversely, moving trigger tab 403 in the direction opposite of arrow 404 and fixedly positioning it in the slot increases the play or hysteresis motion of movable arms 306a/b. This allows the installer to use the road crossing tool with cables of different diameters. This adjustment permits, for example, the accommodation of a larger diameter cable than one previously installed without prematurely opening latch 401 during the installation of the larger cable.

Figure 5:
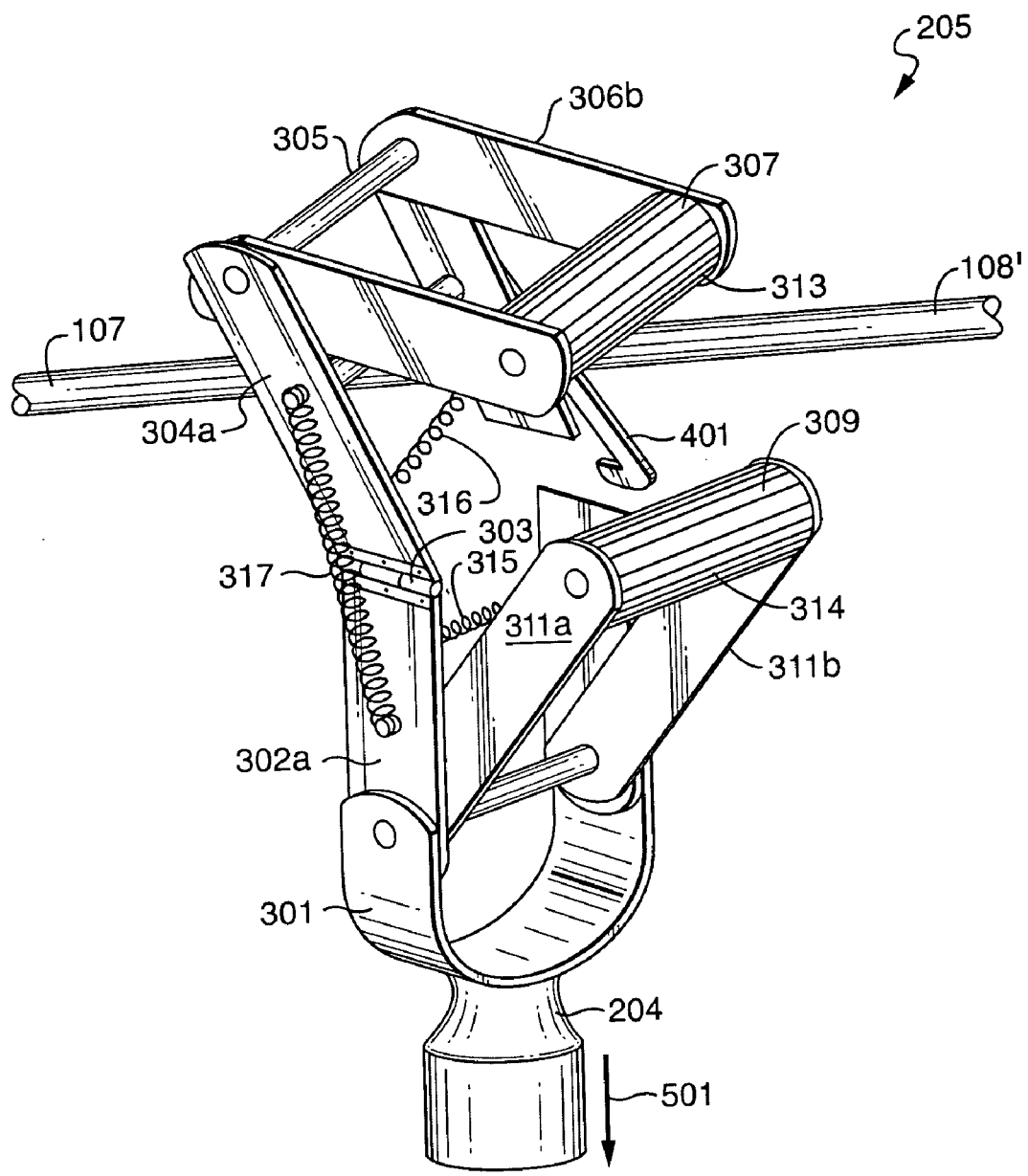

FIG. 5 depicts cable holder 205 in its open position. This position in achieved by the installer pulling downward, i.e., in direction 501. The mast has removable sections 202, 203 and 204. One section can be removed allowing sufficient room for the installer to pull downward on the mast portion that remains connected to cable holder 205. If cable 107/108' had been connected to house 101, the cable is then taut, and the upward force on roller 307 from being pulled downward against taut cable 107/108' causes rotatable arms 306a/b to rotate around axel 305, thereby causing triggering tab 403 to strike latch 401. Once latch 401 is disengaged from its holding tab 406, the effect of stretched spring 317 pulling on movable leg 304a causes the leg to rotate around hinge 303. This opens the cable holder into the position shown, and by simple manual manipulation the cable holder can be removed from cable 107/108' by the installer.

In an alternative embodiment, two cable guides or limit-stops (not shown) would be affixed to rotatable arms 306a and 306b, one on either end of roller 307. These guides could be formed by merely extending the length of rotatable arms beyond their current length, but keeping the axel 307a at its current location. These guides would serve to keep cable 107/108' from sliding away from roller 307, when the installer pulls downward on the mast as described above, by limiting motion of the cable to not exceed the end of roller 307. Thus, if the downward pull were not substantially vertical, the mechanism would still properly function, as described above. In other words, the two limit stops, can each be formed at either end of roller 307, the upper one of the roller devices, and can be configured to prevent the line from losing contact with roller device 307 by preventing the line from sliding off in the direction of the roller axis, when the downward force is applied.

While several illustrative embodiments of the present invention have been shown and described, numerous variations and alternative embodiments may occur to those skilled in the art. Embodiments of the present invention have applicability in any field involving installation of cable across a roadway, including TV cable, power lines, etc. The optical fiber telecommunications cable depicted and referenced herein can carry voice and data information in a broadband capacity. Although such cable or line may be referred to hereinabove as optical fiber telephone cable, the entire broadband capability of such cable is intended. Such variations and alternative embodiments are contemplated, and can be made without departing from the spirit and scope of the present invention as defined in the appended claims.

What is claimed is:

1. Apparatus for facilitating installation of a line by an installer, one end of said line being connected from a first elevated connector mounted on an erected utility pole located at one side of a roadway and the other end of said line being connected to another like-elevated connector mounted on a building located on the opposite side of said roadway, said apparatus located on said opposite side of said roadway and comprising:
   a base;
   a vertical member extending upward from said base; and
   a mechanism mounted at the top end of said vertical member, said mechanism including:
      means for permitting a line to be fed through said mechanism in a first direction;
      means for engaging said line to prevent said line from displacement in a direction opposite to said first direction thereby permitting said installer to connect said other end to said another connector; and
      means for disengaging said line in response to a downward displacement of said vertical member without disturbing the connections of said one end and said other end;
      wherein said permitting means includes:
         two spring-loaded roller devices, each one of said devices being rotatable only in one direction, the spring forces in said spring-loaded devices tending to pull said rollers together into a first roller position in which the axes of rotation of the roller devices are generally parallel; and
         a latch for helping to maintain said roller devices in said first roller position and in a manner that said devices rotate in said one direction when said line is displaced in said first direction.

2. The apparatus of claim 1 wherein the building is a house, the first elevated connector is approximately eighteen feet above ground level and said another connector is approximately eighteen feet above ground level.

3. The apparatus of claim 1 wherein said line is an optical fiber cable.

4. The apparatus of claim 1 wherein said vertical member is comprised of multiple interconnecting poles capable of hand-insertion and removal.

5. The apparatus of claim 1 wherein said engaging means comprises:
   said two spring-loaded roller devices arranged to firmly grip said line therebetween when attempted displacement of said line in said direction opposite to said first direction attempts to cause said devices to rotate in a direction opposite to said one direction.

6. The apparatus of claim 5 wherein said engaging means permits said installer to tautly connect said other end to said another connector resulting in a taut line.

7. The apparatus of claim 6 wherein said disengaging means comprises:
   a rotatable trigger tab connected to the axis of rotation of one of said roller devices and arranged to strike said latch when said one of said roller devices is angularly displaced about said axis of rotation in response to force being applied to said one of said roller devices by said taut line resulting from said downward displacement, thereby preventing said latch from maintaining said first roller position and disengaging said line.

8. The apparatus of claim 7 wherein the rotatable trigger tab comprises:
   means for adjusting triggering-distance between said trigger tab and said latch whereby differently-sized ones of said line can be accommodated by said mechanism.

9. The apparatus of claim 7 including two limit stops, each limit stop being formed at either end of said one of said roller devices and configured to prevent said line from losing contact with said one of said roller devices when said force is applied.

10. The apparatus of claim 5 wherein said two spring-loaded roller devices include a ratcheting mechanism to permit rotation only in said one direction.

11. The apparatus of claim 10 wherein said spring loaded roller devices are cylindrically-shaped with axes of rotation that are substantially parallel when said devices grip said line therebetween and wherein the cylindrical surfaces of said devices include:
   ribbing formed in a direction substantially parallel to said axes of rotation, said ribbing in cooperation with said ratcheting mechanism and responsive to said spring force for gripping said line.

12. The apparatus of claim 10 wherein said spring loaded roller devices are cylindrically-shaped with axes of rotation that are substantially parallel when said devices grip said line therebetween and wherein the cylindrical surfaces of said devices are formed from rubberized-material, the rubberized material in combination with said ratcheting mechanism and said spring force generating sufficient frictional force against said line to grip said line.

13. The apparatus of claim 1 wherein said line is selected from the group consisting of an electrical power cable, a telephone cable, an Internet cable and a cable-TV cable.

* * * * *